US012731568B2

(12) United States Patent
Sato et al.

(10) Patent No.: US 12,731,568 B2
(45) Date of Patent: Sep. 8, 2026

(54) INFORMATION PROCESSING DEVICE, METHOD AND RECORDING MEDIA

(71) Applicant: CASIO COMPUTER CO., LTD., Tokyo (JP)

(72) Inventors: Hiroki Sato, Tokyo (JP); Hajime Kawashima, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1043 days.

(21) Appl. No.: 17/901,782

(22) Filed: Sep. 1, 2022

(65) Prior Publication Data

US 2023/0090773 A1 Mar. 23, 2023

(30) Foreign Application Priority Data

Sep. 22, 2021 (JP) ................................ 2021-153712

(51) Int. Cl.

| | |
|---|---|
| ***G10H 7/02*** | (2006.01) |
| ***G10H 1/00*** | (2006.01) |
| ***G10H 1/36*** | (2006.01) |

(52) U.S. Cl.

CPC ............. *G10H 7/02* (2013.01); *G10H 1/0008* (2013.01); *G10H 1/366* (2013.01); *G10H 2250/211* (2013.01)

(58) Field of Classification Search

CPC ........ G10H 7/02; G10H 1/0008; G10H 1/366; G10H 2250/211

See application file for complete search history.

(56) References Cited

U.S. PATENT DOCUMENTS

2006/0081119 A1 4/2006 Kuroda

FOREIGN PATENT DOCUMENTS

| | | | |
|---|---|---|---|
| JP | H5-297866 A | | 11/1993 |
| JP | 3704842 B2 | * | 10/2005 |
| JP | 2006-113487 A | | 4/2006 |
| JP | 2007-65471 A | | 3/2007 |
| JP | 2008-89975 A | | 4/2008 |

* cited by examiner

*Primary Examiner* — Jianchun Qin

(74) *Attorney, Agent, or Firm* — CHEN YOSHIMURA LLP

(57) ABSTRACT

An information processing device includes: an input interface; and at least one processor, configured to perform the following: selecting an instrument, a musical tone of which is to be digitally synthesized based on corresponding musical tone data, via the input interface; acquiring a parameter value that has been set for the selected instrument; generating a random number based on a random function; and changing a pitch of the musical tone of the selected instrument based on the generated random number and the acquired parameter values.

14 Claims, 15 Drawing Sheets

111

| Key number | Generator section No. | Key press time T2 | Element value V3 (most recent pitch shift) |
|---|---|---|---|
| A0 | -1 | -1 | 0 |
| A1 | 100 | Time A | A |
| A2 | 20 | Time B | B |
| ⋮ | ⋮ | ⋮ | ⋮ |
| C6 | -1 | Time C | C |
| C7 | 68 | Time D | D |
| C8 | -1 | -1 | 0 |

FIG. 5

| Parameters | Acustic Bass | Trumpet | Violin | Guitar |
|---|---|---|---|---|
| Depth (DEPTH) | 60 | 80 | 20 | 5 |
| Time linkTIME_LINK) | 50 | 60 | 20 | 30 |
| Key link (KEY_LINK) | 70 | 50 | 40 | 0 |
| Key link curve (KEY_LINK_CURVE) | B | C | B | A |
| Key link curve depth (KEY_LINK_CURVE_DEPTH) | 60 | 70 | 50 | 0 |
| Key link curve center key (KEY_LINK_CURVE_CENTER_KEY) | 60 | 60 | 60 | 60 |
| Repeat link (REPEAT_LINK) | 70 | 20 | 60 | 30 |
| Bias (BIAS) | -75 | -50 | -30 | +90 |
| Bias curve (BIAS_CURVE) | A | B | A | A |
| Bias curve depth (BIAS_CURVE_DEPTH) | 0 | 80 | 0 | 0 |
| Bias curve center key (BIAS_CURVE_CENTER_KEY) | 60 | 60 | 60 | 60 |
| EG rate(EG_RATE) | 20 | 30 | 75 | 40 |
| EG rate time link (EG_RATE_TIME_LINK) | 70 | 40 | 60 | 60 |
| EG rate key link (EG_RATE_KEY_LINK) | 80 | 20 | 70 | 20 |

FIG. 6

INFORMATION PROCESSING DEVICE, METHOD AND RECORDING MEDIA

BACKGROUND OF THE INVENTION

Technical Field

The disclosure of this specification relates to an information processing device, a method and a storage medium therefor.

Background Art

Electronic musical instruments with multiple keys are known. For example, the electronic musical instrument described in Japanese Patent Application Laid-Open No. 2008-89975 has a specific configuration of this type of electronic musical instrument.

In the electronic musical instrument described in above publication, keys, which are performance elements, are associated with prescribed pitches on a one-to-one basis. Therefore, when a key is pressed by the user, the electronic musical instrument produces the sound of the musical tone at the pitch associated with the pressed key accurately.

SUMMARY OF THE INVENTION

Features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an information processing device that includes at least one processor. At least one processor selects an instrument, acquires a parameter value corresponding to the selected musical instrument, generates a random number based on a random function, and causes the pitch of the musical instrument that is produced based on musical tone data to change in accordance with the generated random number and the parameter value.

In another aspect, the present disclosure provides an information processing device, comprising: an input interface; and at least one processor, configured to perform the following: selecting an instrument, a musical tone of which is to be digitally synthesized based on corresponding musical tone data, via the input interface; acquiring a parameter value that has been set for the selected instrument; generating a random number based on a random function; and changing a pitch of the musical tone of the selected instrument based on the generated random number and the acquired parameter value.

In another aspect, the present disclosure provides a method performed by at least one processor included in an information processing device that includes, in addition to the at least one processor, an input interface, the method comprising, via the at least one processor: selecting an instrument, a musical tone of which is to be digitally synthesized based on corresponding musical tone data, via the input interface; acquiring a parameter value that has been set for the selected instrument; generating a random number based on a random function; and changing a pitch of the musical tone of the selected instrument based on the generated random number and the acquired parameter value.

In another aspect, the present disclosure provides a non-transitory computer-readable storage medium storing a program readable and executable by at least one processor included in an information processing device that includes, in addition to the at least one processor, an input interface, the program causing the at least one processor to perform the following: selecting an instrument, a musical tone of which is to be digitally synthesized based on corresponding musical tone data, via the input interface; acquiring a parameter value that has been set for the selected instrument; generating a random number based on a random function; and changing a pitch of the musical tone of the selected instrument based on the generated random number and the acquired parameter value.

It is to be understood that both the foregoing general description and the following detailed description are exemplary and explanatory, and are intended to provide further explanation of the invention as claimed.

BRIEF DESCRIPTION OF THE DRAWINGS

FIG. 5 is a diagram showing an example of a keyboard sound production map stored in the RAM of the electronic musical instrument in the embodiment of the present invention.

FIG. 6 is a diagram showing parameter values of the respective parameters stored in the ROM of the electronic musical instrument in the embodiment of the present invention.

DETAILED DESCRIPTION OF EMBODIMENTS

An information processing device according to an embodiment of the present invention will be described in detail with reference to the drawings.

Figure 1:
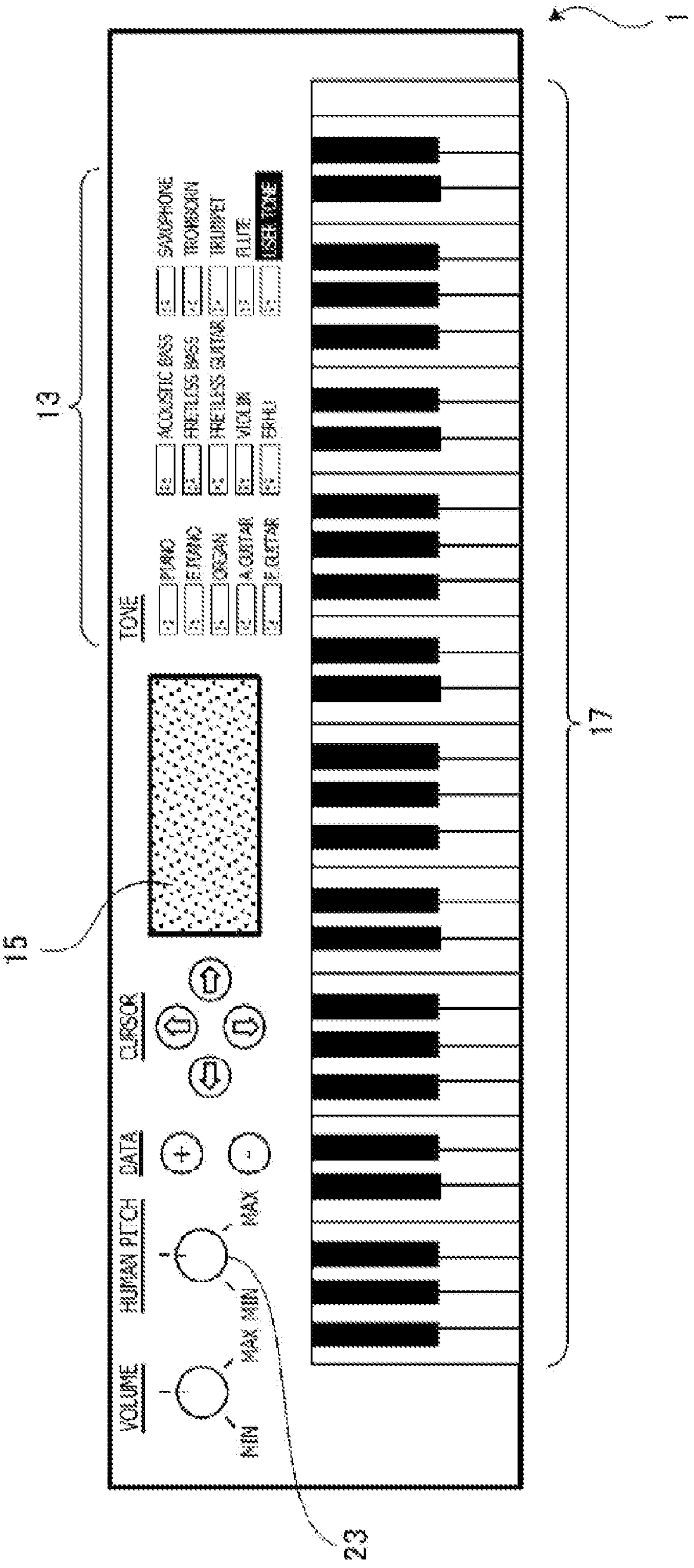
FIG. 1 is a diagram showing the overall appearance of an electronic musical instrument according to an embodiment of the present invention.
Figure 2:
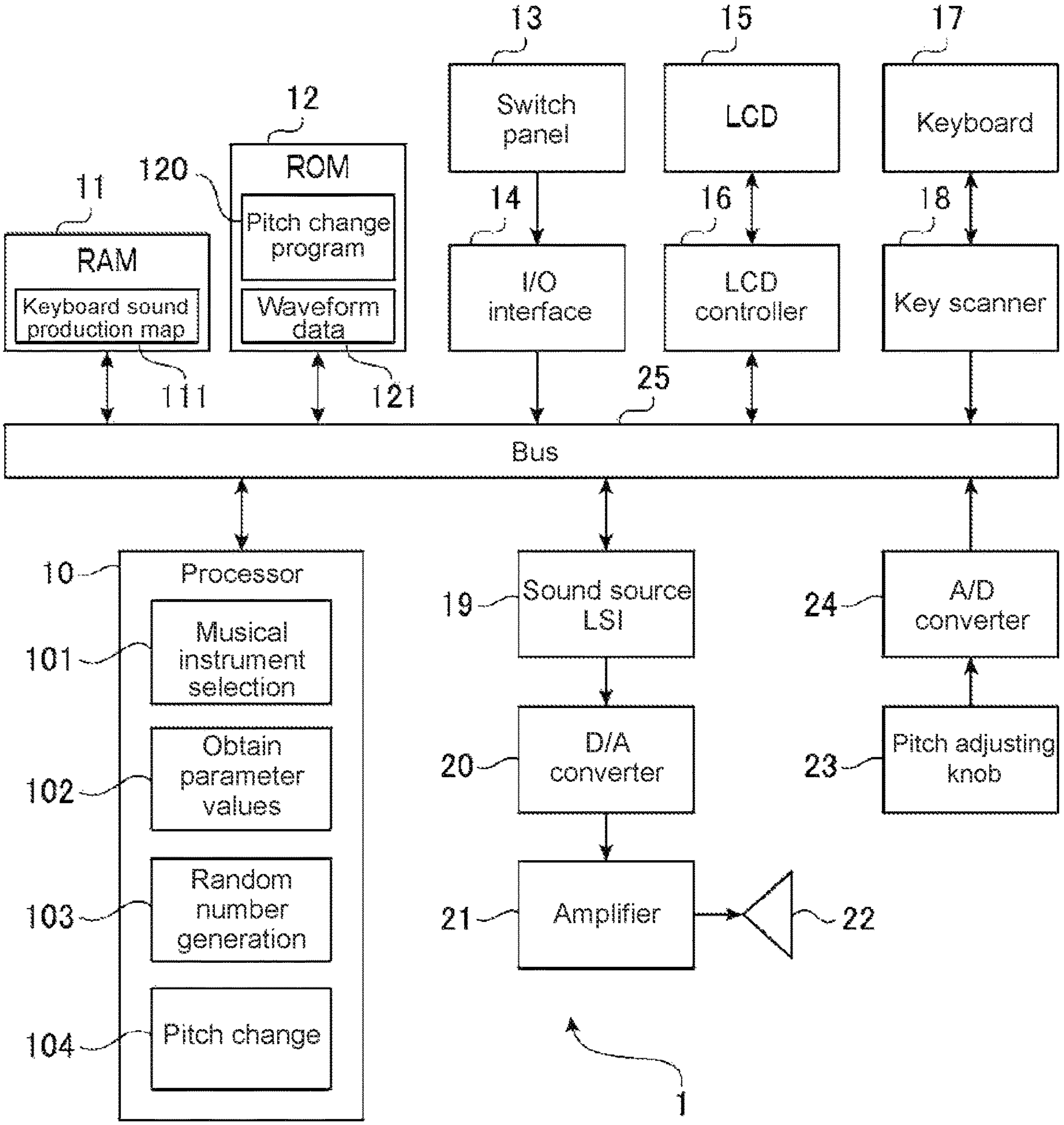
FIG. 2 is a block diagram showing a configuration of the electronic musical instrument according to the embodiment of the present invention.

FIG. 1 is a diagram showing the overall appearance of an electronic musical instrument 1, which is an example of an information processing device. FIG. 2 is a block diagram showing the configuration of the electronic musical instrument 1. As shown in FIGS. 1 and 2, the electronic musical instrument 1 according to the present embodiment is an electronic keyboard.

Generally, when a performer plays a fretless instrument (violin, viola, acoustic bass, fretless electric bass, etc.) or wind instrument (trumpet, trombone, saxophone, etc.) without frets on the fingerboard, the pitch of the musical sound has some recognizable deviation. Also, when playing an instrument with frets (guitar, etc.), the pitch of the musical tone may shift in the same way. In the present specification, "pitch deviation" of "pitch shift" means an error with respect to the reference pitch. The reference pitch is, for example, the correct pitch on the score.

The pitch shift of the musical tone when playing the acoustic instruments exemplified above has the following tendency. For example, in stringed instruments, the pitch shift tends to be larger in the high register. In wind instruments and human voices, there is a tendency that the sound does not go down sufficiently in the low register range and the sound does not go up sufficiently in the high register range. Further, the faster the playing or played speed, the larger the pitch shift tends to be. When playing a musical tone of the same key repeatedly, the pitch difference from the previous musical tone tends to become smaller. The distribution of pitch shifts may be higher or lower depending on the instrument. The higher the range or the faster the performance, the faster the speed of the operation for correcting the pitch deviation tends to be.

On the other hand, in an electronic musical instrument, a performance element and a pitch are associated with each other on a one-to-one basis. Therefore, musical tones are produced at accurate pitches. With electronic musical instruments, there is no pitch shift/deviation as when playing an acoustic instrument, so it's musical tone sounds unnatural and mechanical.

Therefore, the electronic musical instrument 1 according to the present embodiment is configured to produce natural instrumental sound (for example, a musical sound with characteristics similar to those of an acoustic instrument) by giving an appropriate shift/deviation to the pitch of the musical instrument based on the type of the musical instrument (in other words, the timbre) selected by the user operation and the playing style of the performer (user). In the electronic musical instrument 1 according to the present embodiment, since an appropriate pitch shift/deviation is produced, the performer can play a musical piece with more human-like expressions on the electronic musical instrument 1 that has the performance elements associated with the corresponding pitches on a one-to-one basis.

The technique of the present invention that gives an appropriate deviation to the pitch of musical tones can be applied to electronic musical instruments other than electronic keyboards.

The electronic instrument 1 has a hardware configuration of a processor 10, a RAM (Random Access Memory) 11, a ROM (Read Only Memory) 12, a switch panel 13, an input/output interface 14, an LCD (Liquid Crystal Display) 15, an LCD controller 16, a keyboard 17, a key scanner 18, a sound source LSI (Large Scale Integration) 19, a D/A converter 20, an amplifier 21, a speaker 22, a pitch adjustment knob 23, and an A/D converter 24. These parts of the electronic musical instrument 1 are connected by a bus 25.

The processor 10 collectively controls the electronic musical instrument 1 by reading out the programs and data stored in the ROM 12 and using the RAM 11 as a work area.

The processor 10 is, for example, a single processor or a multiprocessor, and includes at least one processor. In the case of a configuration including a plurality of processors, the processor 10 may be packaged as a single device, or may be composed of a plurality of physically separated devices in the electronic musical instrument 1.

As functional blocks, the processor 10 includes a musical instrument selection part 101 that selects a musical instrument (tone), a parameter value acquisition part 102 that acquires parameter values corresponding to the selected musical instrument, and a random number generation part 103 that generates a random number based on a random function, and a pitch changing part 104 that changes the pitch of the musical instrument that is sound-produced based on musical tone data in accordance with the random number generated by the random number generation part 103, and the parameter values acquired by the parameter value acquisition part 102. By the operation of these functional blocks, the electronic musical instrument 1 can produce a natural musical sound by giving an appropriate shift/deviation to the pitch of the musical sound. The method and program according to the embodiment of the present invention are realized by causing the functional blocks of the processor 10 to execute various processes.

RAM 11 temporarily holds data and programs. The RAM 11 holds programs and data read from the ROM 12, and other data necessary for communication.

The ROM 12 is a non-volatile semiconductor memory such as a flash memory, an EPROM (Erasable Programmable ROM), and an EEPROM (Electrically Erasable Programmable ROM), and plays a role as a secondary storage device or an auxiliary storage device. The ROM 12 stores programs and data used by the processor 10 to perform various processes, including a pitch change program 120 and a plurality of waveform data 121 (an example of musical tone data).

In the present embodiment, each functional block of the processor 10 is realized by the pitch change program 120, which is software. It should be noted that each functional block of the processor 10 may be partially or wholly realized by hardware such as a dedicated logic circuit.

In the present embodiment, an electronic musical instrument 1 having musical sound data and capable of performing sound generation processing will be described as an example, but the information processing device according to the present invention is not limited to this. An information processing device that does not have musical tone data and an information processing device that does not perform sound processing are also within the scope of the present invention.

For example, an information processing device such as a PC (Personal Computer) capable of performing processing of each functional block of the processor 10 described above is also within the scope of the present invention. Such an information processing device acquires musical tone data from the outside, performs processing to give a pitch shift to the acquired musical tone data (that is, processing of the respective functional blocks of the processor 10), and outputs the processed musical tone data to an external device so as to perform sound generation processing. That is, any information processing device capable of performing processing of the respective functional blocks of the processor 10 is included within the scope of the present invention even if it is not an electronic musical instrument.

The switch panel 13 is an example of an input device/interface. When the performer operates the switch panel 13, a signal indicating the operation content is output to the processor 10 via the input/output interface 14. The switch panel 13 is composed of, for example, key switches and/or buttons, such as a mechanical type, a capacitive contactless type, a membrane type or the like. The switch panel 13 may be a touch panel.

In the present embodiment, the performer can select the timbre (musical instrument) to be sound-produced by the electronic musical instrument 1 through the operation on the switch panel 13. The instruments that can be selected by operating the switch panel 13 include, for example, piano, electronic piano, organ, acoustic guitar, electric guitar, acoustic bass, fretless electric bass, fretless guitar, violin, erhu, saxophone, trombone, trumpet, flute, viola, etc. For convenience, a tone selected by the operation (including a tone that is in the pre-selected state when the system of the electronic musical instrument 1 is started) is referred to as a "selected tone/timbre" or a "selected instrument".

LCD 15 is an example of a display device. The LCD 15 is driven by the LCD controller 16. When the LCD controller 16 drives the LCD 15 according to the control signal by the processor 10, the LCD 15 displays a screen corresponding to the control signal. The LCD 15 may be replaced with other display devices, such as an organic EL (Electro Luminescence) or an LED (Light Emitting Diode). The LCD 15 may be a touch panel. In this case, the touch panel may serve as both an input device and a display device.

The keyboard 17 is a keyboard having a plurality of white keys and a plurality of black keys as a plurality of performance elements. Each key is associated with a different pitch.

The key scanner 18 monitors the key press and release of the keyboard. When the key scanner 18 detects, for example, a key press operation by a performer, the key scanner 18 outputs key press event information to the processor 10. The key press event information includes information on the pitch of the key related to the key press operation (key number) and its velocity (velocity value). The velocity value can be said to indicate the strength of the key press operation. The key number is sometimes called a key number, or a MIDI key or note number.

The processor 10 instructs the sound source LSI 19 to read out the corresponding waveform data 121 from the plurality of waveform data 121 stored in the ROM 12. The waveform data 121 to be read is determined by the selected tone color and the key pressing event information (that is, the key number of the pressed key and the velocity value at the time of key pressing).

The sound source LSI 19 generates a musical tone based on the waveform data read from the ROM 12 under the instruction of the processor 10. The sound source LSI 19 includes, for example, 128 generator sections, and can simultaneously produce up to 128 musical tones. In the present embodiment, the processor 10 and the sound source LSI 19 are configured as separate devices, but in another embodiment, the processor 10 and the sound source LSI 19 may be configured as a single processor.

The musical sound signal generated by the sound source LSI 19 is amplified by the amplifier 21 after DA conversion by the D/A converter 20, and is output to the speaker 22. That is, the electronic musical instrument 1, which is an example of the information processing device, is configured to include a speaker 22 for producing a musical sound in this embodiment.

The pitch adjustment knob 23 is an example of an input device. When the performer operates the pitch adjustment knob 23, a signal indicating the operation content is output to the processor 10 via the A/D converter 24. The processor 10 controls the amount of shift/deviation to be given to the pitch of the musical tone based on the signal input from the A/D converter 24.

Figure 3:
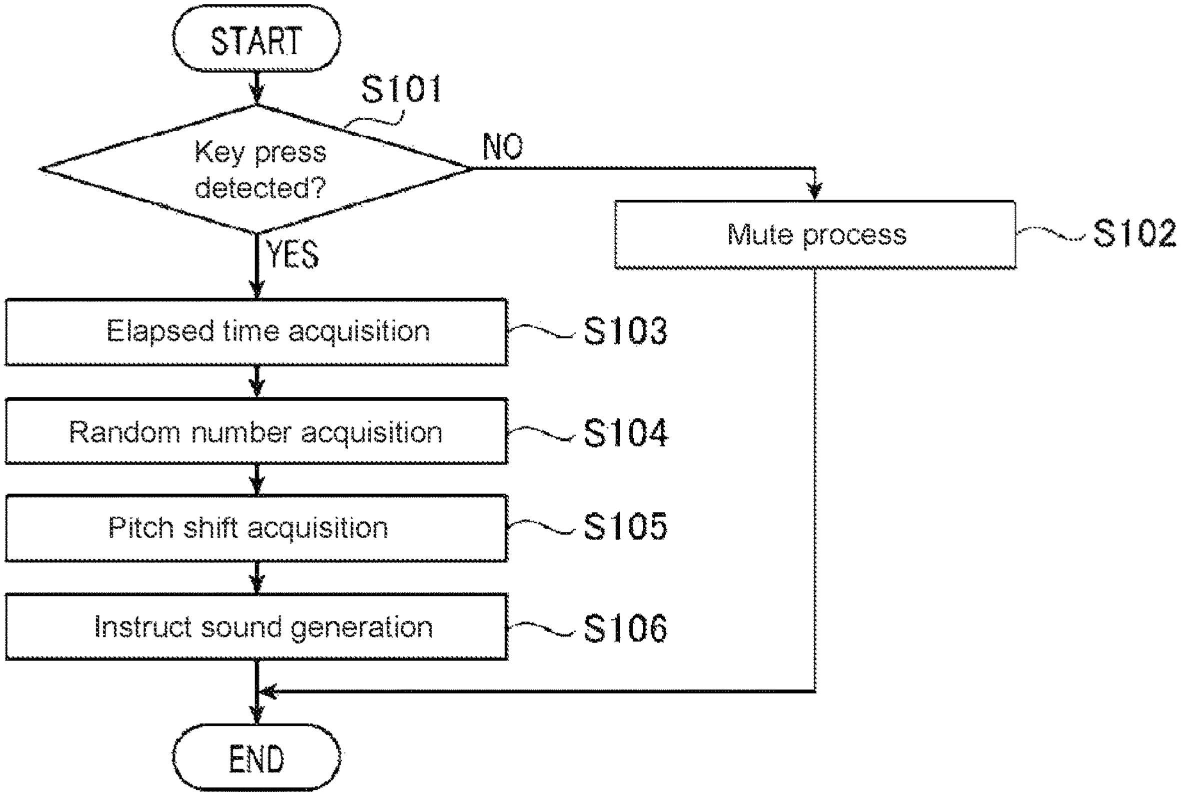
FIG. 3 is a flowchart showing the processing of the pitch change program executed by a processor of the electronic musical instrument in an embodiment of the present invention.

FIG. 3 is a flowchart showing the processing of the pitch change program 120 executed by the processor 10 in the present embodiment. When the processor 10 detects the occurrence of a keyboard event, the processor 10 starts executing the process of the flowchart shown in FIG. 3. A keyboard event is a key pressing operation or a key release operation by a performer.

As shown in FIG. 3, the processor 10 determines whether or not a keyboard event that has been detected is a key press operation (step S101).

In the case of the key release operation (step S101: NO), the processor 10 performs a mute process to mute the musical tone of the key that was released (step S102), and ends the process of this flowchart.

In the case of key pressing operation (step S101: YES), the processor 10 performs an elapsed time acquisition process (step S103), a random number acquisition process (step S104), and a pitch shift acquisition process (step S105) in that order. Next, the processor 10 issues an instruction to generate sound to the sound source LSI 19 according to the result of the pitch shift acquisition process in step S105 (step S106). In response to this sound generation instruction, a musical sound generation process is performed by starting a readout of the waveform data 121 in the generator section of the sound source LSI 19 so as to produce the musical sound in which the pitch was appropriately shifted/deviated according to the timbre (instrument) and the playing style of the performer.

The elapsed time acquisition process (step S103), the random number acquisition process (step S104), and the pitch shift (deviation) acquisition process (step S105) will be described.

Figure 4:
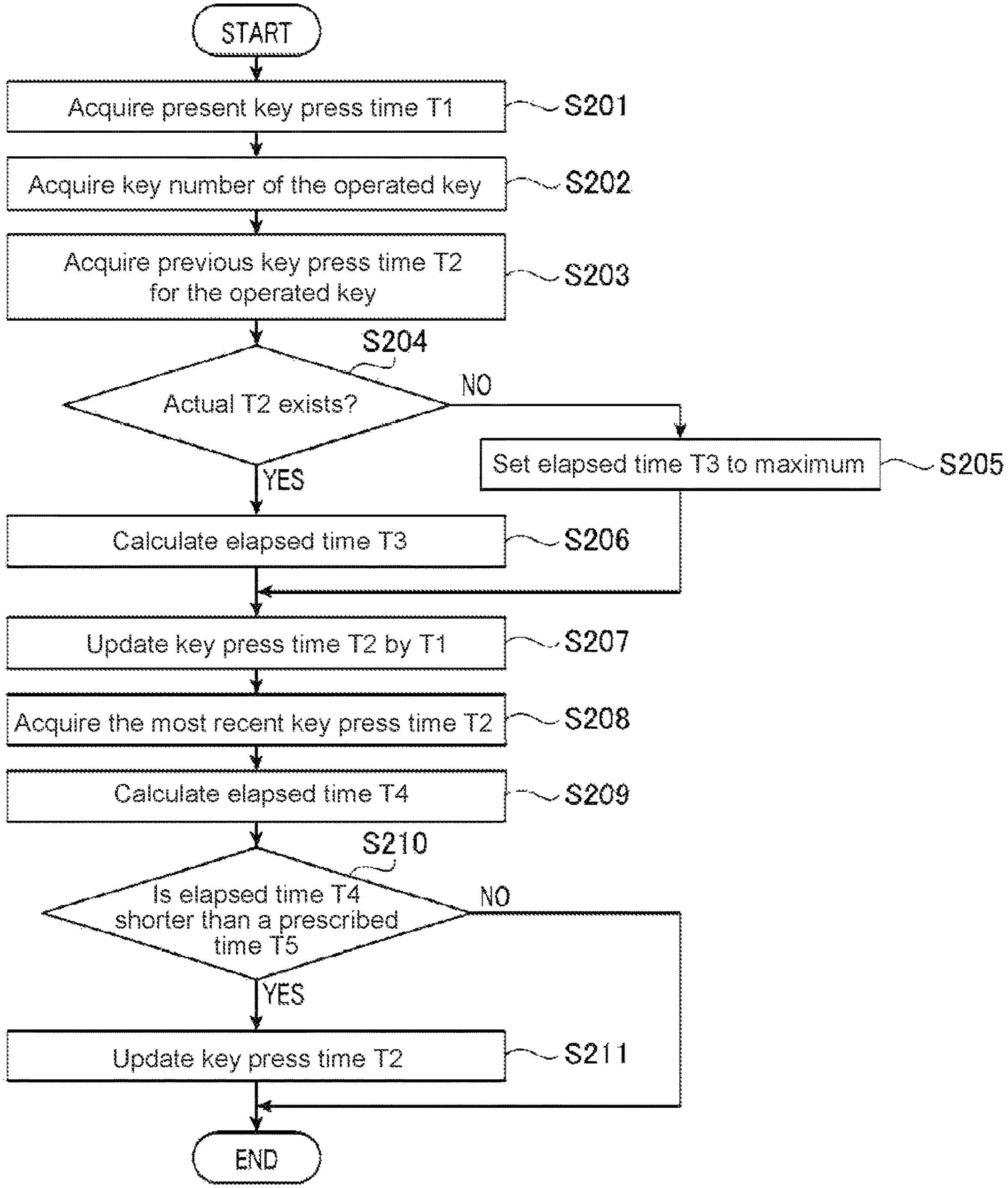
FIG. 4 is a subroutine showing the process of step S103 of FIG. 3.

FIG. 4 is a subroutine showing details of the elapsed time acquisition process in step S103 of FIG. 3. The processor 10 has a built-in timer. As shown in FIG. 4, the processor 10 acquires the key press time T1 at which the current key pressing operation is performed from the timer (step S201). The time T1 can be rephrased as the time when the occurrence of a keyboard event is detected. For convenience, the key for which the key pressing operation that triggered the start of the execution of the processing of the flowchart of FIG. 3 is referred to as an "operated key".

The processor 10 acquires the key number of the operated key from the key press event information input from the key scanner 18 (step S202).

A keyboard sound production map 111 is stored in the RAM 11. FIG. 5 shows an example of the keyboard sound production map 111.

The keyboard sound production map 111 shows the sound production state, the key press time, and the pitch shift/deviation of the immediately preceding pitch for each key. As shown in FIG. 5, in the keyboard sound production map 111, for each key number of the keyboard 17 having a total of 88 keys corresponding to the keys A0 to C8, information on the number of the generator section in use (during music generation processing) (referred to as "generator section number"), information on the previous key press time T2, and information on the element value V3 (details will be described later) indicating the most recent pitch shift/deviation amount are each stored as associated with the key number. The 128 generator sections are assigned generator section numbers from 1 to 128. The keyboard sound production map 111 is sequentially updated according to the key press operation status, the musical tone generation processing status by each generator section of the sound source LSI 19, and the pitch shift given to the musical tone.

The generator section number and key press time T2 associated with each key number are both set to "−1" in the initialization process when the system of the electronic musical instrument 1 is started or when the tone color (musical instrument) is changed. Further, the element value V3, which will be described below, is set to "0" in this initialization process. When "−1" is set in the generator section number, it indicates that the musical tone of the key number associated with this generator section number is not being produced. In the example of FIG. 5, the generator section number of "−1" is associated with the key number of A0. This indicates that the musical tone of the A0 key is not produced. When "−1" is set for the key press time T2, it indicates that the key of the key number associated with that key press time is presently pressed for the first time since the initialization process at the time of system startup or the tone color change operation is performed, or that key has not been pressed yet.

The processor 10 acquires the key press time T2 associated with the key number acquired in step S202 from the keyboard sound production map 111 (step S203).

The processor 10 determines whether or not the information acquired in step S203 indicates an actual previous key press time T2 (step S204). When the acquired information is "−1" (step S204: NO), it indicates that the operated key is pressed for the first time after the initialization process at the time of system startup or the tone color change operation is performed. In this case, in the present embodiment, the elapsed time T3 from the previous key press time T2 to the current key press time T1 acquired in step S201 is set as infinity. Specifically, the processor 10 sets the elapsed time T3 to the maximum settable time and stores it in, for example, the RAM 11 (step S205).

When the information acquired in step S203 indicates an actual previous key press time T2 (step S204: YES), the processor 10 calculates the elapsed time T3 that has elapsed from the key press time T2 to the key press time T1 acquired in step S201, and stores it in, for example, RAM 11 (step S206).

The processor 10 updates the keyboard sound production map 111. Specifically, the processor 10 sets the key press time T1 acquired in step S201 as the previous key press time T2, so as to update the key press time T2 associated with the key number of the operated key (step S207).

In a stringed instrument, multiple strings may be played at the same time, for example. In this case, since the strings are physically separated, the timing of the start of sound due to the vibration of each string is not exactly the same. However, it is desirable to treat them as one sound (for example, a chord) as a performance expression.

For that purpose, the processor 10 acquires, among the key press times T2 of all the key numbers of the keyboard sound production map 111, a key press time T2 that is the closest in time before (one before) the key press time T1 acquired in step S201 (step S208), and calculates the elapsed time T4 that has elapsed from the acquired key press time T2 to the current key press time T1 (step S209). Next, the processor 10 determines whether or not the elapsed time T4 is shorter than the predetermined time T5 (very short time, for example, 20 milliseconds) (step S210).

When the elapsed time T4 is shorter than the predetermined time T5, it is treated as if the sound production by the key pressing operation at the current key press time T1 and the sound production by the key pressing operation at the most recent key press time T2 being performed at the same time. Specifically, when the elapsed time T4 is shorter than the predetermined time T5 (step S210: YES), the processor 10 treats it as if the key pressing operations at these times were performed at the same time, and updates the key press time T2 associated with the key number of the operated key by the key press time T2 that was obtained in step S208 (step S211). Thereafter, the subroutine of FIG. 4 is terminated.

When the elapsed time T4 is equal to or longer than the predetermined time T5 (step S210: NO), the processor 10 ends the subroutine of FIG. 4 without updating the key press time T2.

FIG. 6 shows parameters for giving a deviation/shift to the pitch of musical tones and their values (parameter values). FIG. 6 shows, as an example, the parameter values set for each tone of an acoustic bass, a trumpet, a violin, and an acoustic guitar. The parameter values of each tone is stored in, for example, ROM 12.

As shown in FIG. 6, the parameters include "depth (DEPTH)", "time link (TIME_LINK)", "key link (KEY_LINK)", "key link curve (KEY_LINK_CURVE)", and "key link curve depth (KEY_LINK_CURVE_DEPTH)", "key link curve center key (KEY_LINK_CURVE_CENTER_KEY)", "Repeat link (REPEAT_LINK)", "Bias (BIAS)", "Bias curve (BIAS_CURVE)", "Bias curve depth (BIAS_CURVE_DEPTH)", "Bias Curve Center Key (BIAS_CURVE_CENTER_KEY)", "EG Rate (EG_RATE)", "EG Rate Time Link (EG_RATE_TIME_LINK)", and "EG Rate Key Link (EG_RATE_KEY_LINK)".

In order to give a shift to the pitch of the musical tone, the parameter values shown in FIG. 6 are used in the random number acquisition process (step S104) and the pitch shift acquisition process (step S105). In the following, the details of each of the above parameters will be described together with the specific description of the random number acquisition process (step S104) and the pitch shift acquisition process (step S105).

Figure 7:
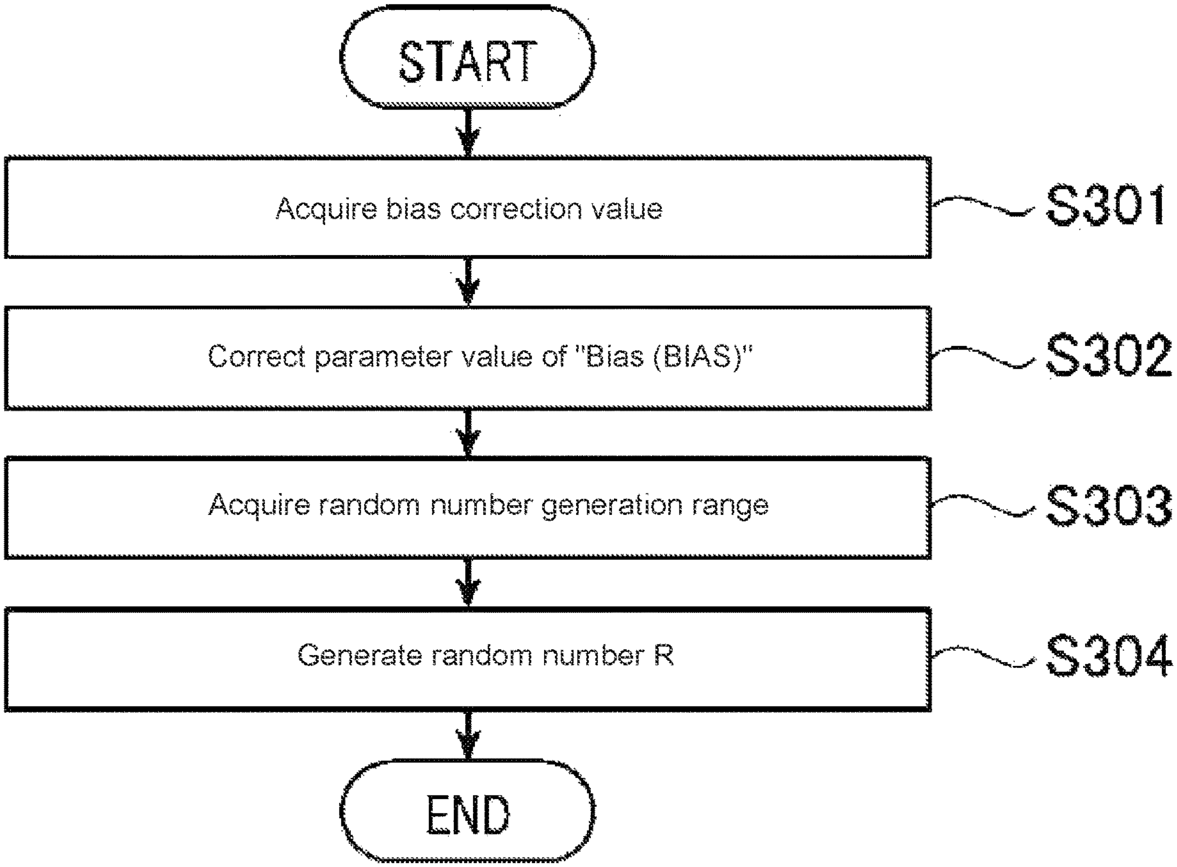
FIG. 7 is a subroutine showing the process of step S104 of FIG. 3.

FIG. 7 is a subroutine showing the details of the random number acquisition process in step S104 of FIG. 3. As shown in FIG. 7, the processor 10 acquires the bias correction value (step S301). The bias correction value is a value for correcting the "bias (BIAS)" parameter.

"Bias (BIAS)" and the bias correction value will be explained.

The pitch of the musical tone varies within a certain range depending on the characteristics and playing style of the instrument. Although details will be described later, in the present embodiment, in order to produce such pitch variation, a random number is generated based on a random function, and the pitch shift/deviation is calculated using the generated random number.

Here, the tendency of the pitch variation differs depending on the instrument. For example, in a fretless musical instrument such as an acoustic bass or a wind instrument such as a trumpet, the pitch of musical tones (more accurately, the initial pitch at which the sound begins to appear) tends to be lower than the reference pitch. Therefore, statistics on the musical tones of this type of instrument show that the pitch shifts are distributed closer to the lower pitch side than the reference pitch. On the other hand, in musical instruments with frets such as acoustic guitars, the pitch of musical tones tends to be higher than the reference pitch. Therefore, statistics on the musical tones of this type of instrument show that the pitch shifts are distributed to the higher pitch side than the reference pitch. By calculating the pitch shift/deviation of the musical tone by reflecting the tendency of such pitch variation, the musical tone can be heard more naturally.

Therefore, in this embodiment, a bias is given to the range of random numbers generated when calculating the pitch shift/deviation of the musical tone.

Figure 8:
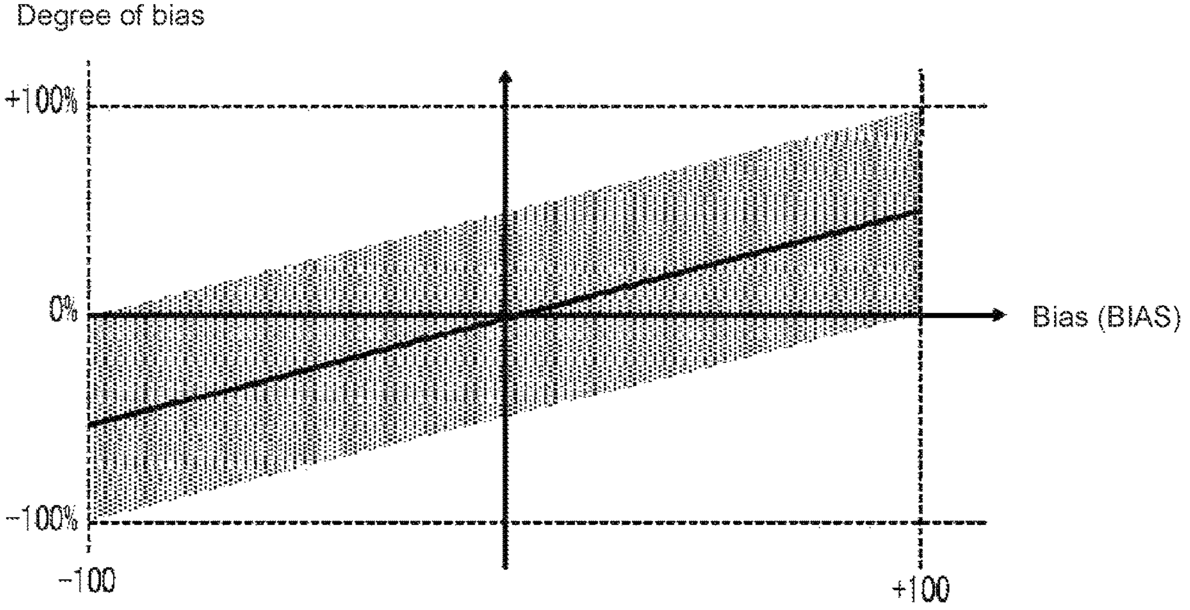
FIG. 8 is a diagram for explaining a range of random numbers generated in the subroutine shown in FIG. 7.

FIG. 8 is a diagram for explaining a range in which random numbers are generated. In FIG. 8, the vertical axis indicates the degree of bias (unit: %), and the horizontal axis indicates "bias (BIAS)". The range of the parameter value of "bias (BIAS)" is, for example, a minimum value of −100 to a maximum value of +100. The shaded area in FIG. 8 shows the range of random numbers generated according to the parameter value of "bias (BIAS)". The characteristic data indicating the generation range of the random number is stored in, for example, the ROM 12.

For example, when there is no bias (that is, the vertical axis is 0%), the random number generation range is, for example, −1 to +1. When biasing toward high frequencies, the range of random numbers generated is, for example, n1 (n1 is larger than −1) to n2 (n2 is larger than +1). When biasing toward low frequencies, the range of random numbers generated is, for example, m1 (m1 is smaller than −1) to m2 (m2 is smaller than +1).

With stringed instruments, there is not much change in the tendency of pitch variation when playing high-pitched keys or low-pitched keys. On the other hand, in wind instruments, when playing high-pitched keys, the pitch tends to shift towards lower frequencies than the reference pitch, and when playing low-pitched keys, the pitch tends to shift towards higher frequencies than the reference pitch. In the case of a real human voice, there is a tendency similar to that of wind instruments. By calculating the pitch shift of the musical tone to reflect such a tendency, the produced musical tone sounds more natural.

Therefore, in the present embodiment, the bias correction value is calculated, and the bias in the random number generation range is adjusted based on the calculated bias correction value. By adjusting the bias according to the played key (the pitch of the key pressed this time) this way, the pitch of the musical tone will vary within a more natural range.

Figure 9A:
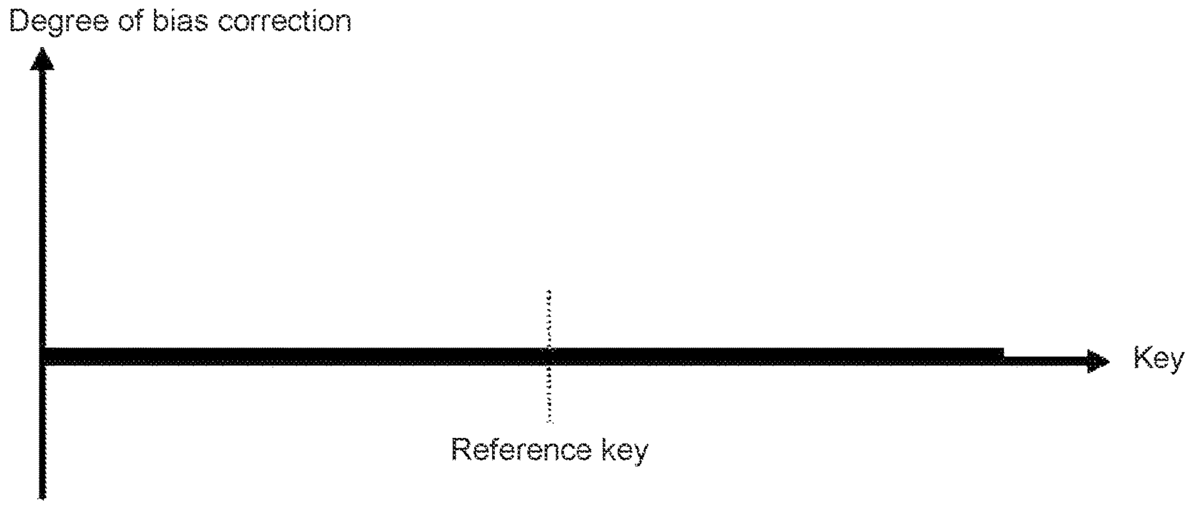
FIG. 9A is a diagram showing a bias correction curve characteristic for biasing the random number generation range.
Figure 9B:
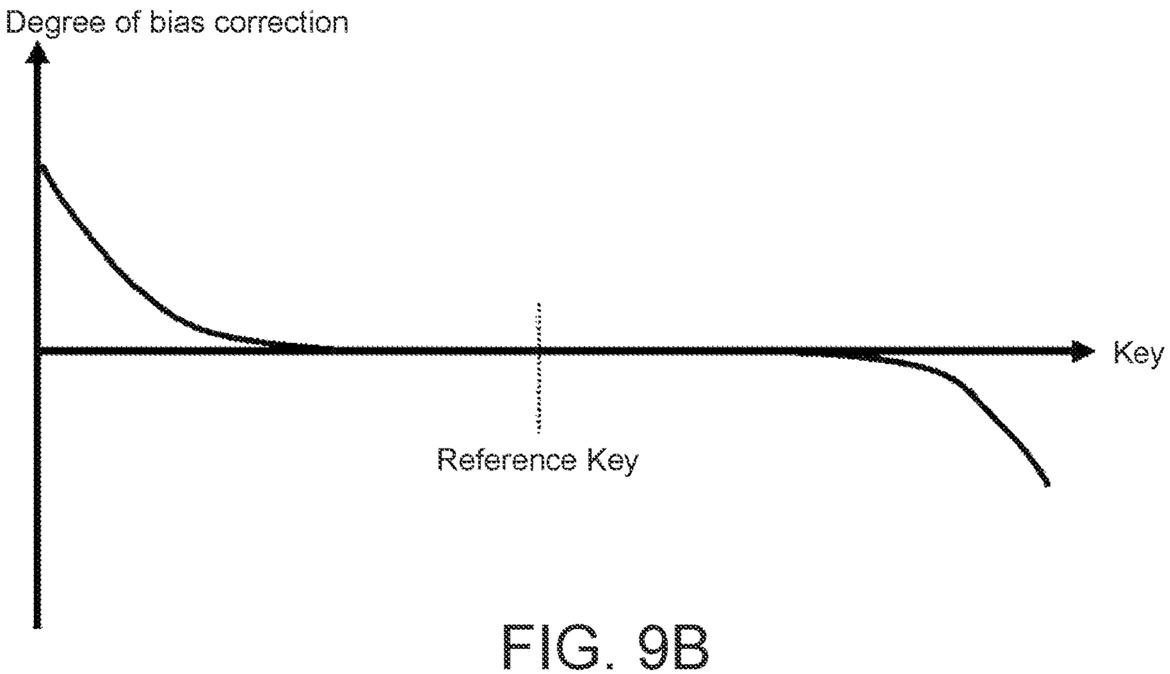
FIG. 9B is a diagram showing a bias correction curve characteristic for biasing the random number generation range.

FIGS. 9A and 9B are diagrams showing the characteristics of the bias correction value (hereinafter referred to as "bias correction curve characteristics"). FIG. 9A shows the bias correction curve characteristics in which the parameter value of the "bias curve (BIAS_CURVE)" corresponds to A. FIG. 9B shows the bias correction curve characteristics in which the parameter value of the "bias curve (BIAS_CURVE)" corresponds to B. In each of FIGS. 9A and 9B, the vertical axis indicates the degree of bias correction, and the horizontal axis indicates the performance key (from another viewpoint, the difference between the reference key and the performance key). The bias correction curve characteristic data is stored in, for example, the ROM 12.

The reference key of the bias correction curve characteristic of FIGS. 9A and 9B is set based on the parameter value of the "bias curve center key (BIAS_CURVE_CENTER_KEY)". This reference key is the key that is the center of the bias correction curve characteristics. The range of the parameter value of the "bias curve center key (BIAS_CURVE_CENTER_KEY)" is, for example, a minimum value of 0 to a maximum value of 127.

For example, when the parameter value of the "bias curve center key (BIAS_CURVE_CENTER_KEY)" is 60, the reference key of the bias correction curve characteristic is set to C4. When the parameter value of the "bias curve (BIAS_CURVE)" is B, the bias is corrected toward the treble when the performance key is lower than C4, and the bias is corrected toward the bass when the performance key is higher than C4.

In step S301, the processor 10 refers to the parameter value of the "bias curve (BIAS_CURVE)" and acquires the bias correction curve characteristic according to the selected tone. The processor 10 acquires the parameter value of the "bias curve center key (BIAS_CURVE_CENTER_KEY)" set for the selected tone, and sets the reference key based on the acquired parameter value. The processor 10 calculates the difference between the set reference key and the performance key. As a result, the position of the horizontal axis on the bias correction curve characteristics is determined. The processor 10 then acquires a value on the vertical axis corresponding to the determined position on the horizontal axis, that is, a value indicating the degree of bias correction, as a bias correction value.

The processor 10 corrects the parameter value of "bias (BIAS)" based on the bias correction value acquired in step S301 (step S302).

Specifically, the processor 10 acquires the parameter value of the "bias curve depth (BIAS_CURVE_DEPTH)" set for the selected tone, and multiplies the bias correction value acquired in step S301 by the acquired parameter value of the "bias curve depth". The "bias curve depth (BIAS_CURVE_DEPTH)" is a parameter for adjusting the depth (degree) of the bias correction curve characteristic, and takes, for example, a minimum value of 0 to a maximum value of 100. Next, the processor 10 acquires the parameter value of "bias (BIAS)" set for the selected tone, multiplies the bias correction value that has gone through the above multiplication process by the acquired parameter value of "bias", and divides it by 100. As a result, the parameter value of "bias (BIAS)" becomes a value corrected according to the operated key.

Thus, the processing content of step S302 is expressed by the following equation. In the equation, "bias (BIAS)" means the parameter value of "bias (BIAS)". In the formula, other parameters are expressed in the same manner.

Corrected "Bias (BIAS)"="Bias curve depth (BIAS_CURVE_DEPTH)"×Bias correction value×"Bias (BIAS)"/100

The processor 10 acquires a random number generation range based on the corrected "bias (BIAS)" parameter value (step S303). Specifically, the position of the horizontal axis of the characteristic data (see FIG. 8) indicating the random number generation range is determined by the parameter value of the "bias (BIAS)" corrected by step S302. The processor 10 acquires the range of the vertical axis corresponding to the position of the determined horizontal axis, that is, the range of generation of random numbers in consideration of this bias.

The processor 10 generates a random number R by a random function within the range acquired in step S303 (step S304), and ends the subroutine of FIG. 7. That is, in the subroutine of FIG. 7, the processor 10 generates a random number R within a range that reflects the tendency of the pitch variation of the musical tone according to the selected timbre and the played key. As a result, the pitch of the musical tone will vary in a natural range.

Figure 10:
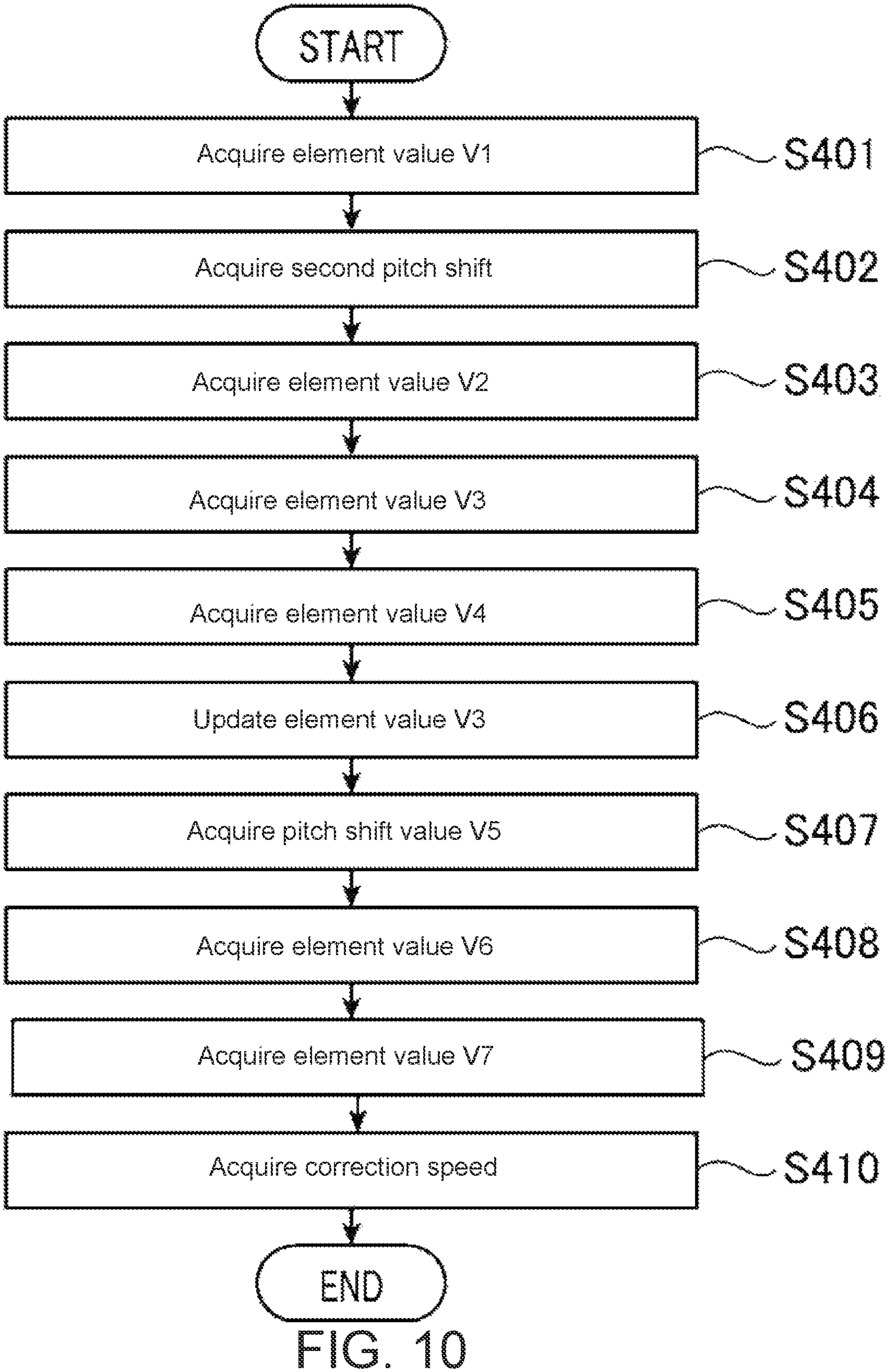
FIG. 10 is a subroutine showing the process of step S105 in FIG. 3.
Figure 11:
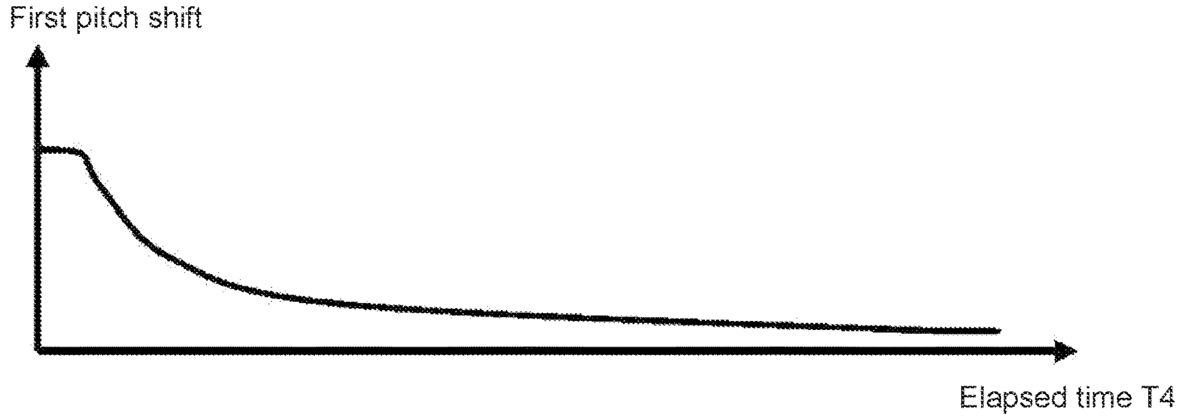
FIG. 11 is a diagram showing the characteristics of the pitch shift of the musical tone according to the played speed.

FIG. 10 is a subroutine showing details of the pitch shift acquisition process in step S105 of FIG. 3. FIG. 11 shows characteristic data (hereinafter referred to as "temporal pitch shift/deviation characteristic data") showing the characteristics of the pitch shift/deviation of the musical tone according to the elapsed time T4. In FIG. 11, the vertical axis indicates a value indicating the degree of pitch shift/deviation (a first value indicating the pitch deviation of a musical tone, hereinafter referred to as "first pitch shift/deviation value"), and the horizontal axis represents the elapsed time T4. The temporal pitch shift characteristic data (first characteristic data) is stored in, for example, a ROM 12 (memory).

The elapsed time T4 indicates the difference between the time when the current key press operation was performed and the time when the previous key press operation was performed. That is, the temporal pitch shift characteristic data (first characteristic data) is the data showing the shift/deviation of the pitch of the musical tone according to the elapsed time of the elapsed time T4 (first elapsed time) that has elapsed from the last operation on a performance element (key) to the next operation on a performance element.

In acoustic instruments, it is more difficult to move your finger to the correct position in order to generate a musical tone at the correct pitch at the faster playing speed. That is, the faster the playing or played speed, the more likely it is for the pitch of the musical tone to shift. Therefore, as shown in FIG. 11, the shorter the elapsed time T4, the larger the pitch deviation.

There is a limit to the playing operation time for generating different musical notes during performance. For example, it is difficult to play different musical notes with an extremely short elapsed time T4 of 20 milliseconds or less. Therefore, in the temporal pitch deviation characteristic data, the pitch deviation is a constant maximum value within the extremely short elapsed time T4 (20 milliseconds).

The processor 10 acquires a value for changing the pitch of the musical tone based on the first value (first pitch deviation value) and the parameter value ("time link (TIME_LINK)") (step S401). That is, in step S401, the processor 10 acquires the element value V1 for realizing the pitch shift according to the played speed.

Specifically, the processor 10 refers to the temporal pitch shift characteristic data in FIG. 11 and acquires the first pitch shift value according to the elapsed time T4 calculated in step S209 in FIG. 4. Next, the processor 10 acquires the parameter value of the "time link (TIME_LINK)" set for the selected tone, and multiplies the first pitch shift value by the acquired parameter value. As a result, the element value V1 is acquired.

The "TIME_LINK" takes, for example, a minimum value of 0 to a maximum value of 100. For example, for instruments/timbres in which it is more difficult to produce a musical sound with the correct pitch (timbre) at the higher playing speed, a higher parameter value is set for the "time link (TIME_LINK)".

Thus, the processing content of step S401 is expressed by the following equation.

Element value $V1$=first pitch shift value×"time link (TIME_LINK)".

Figure 12A:
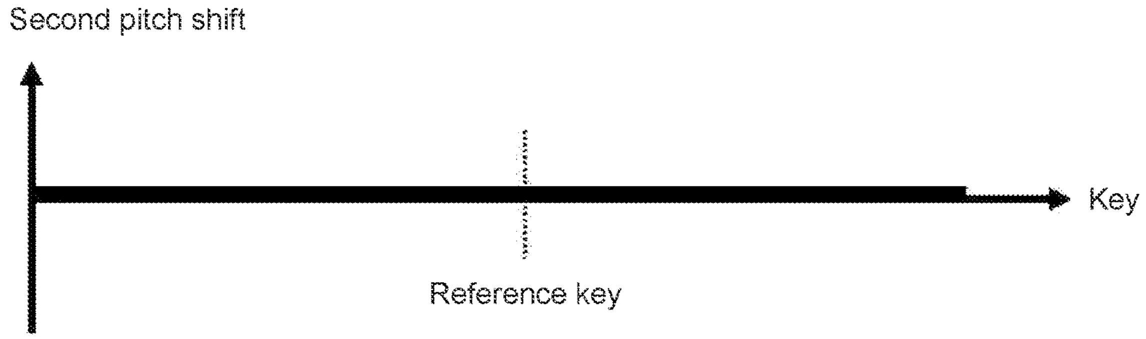
FIG. 12A is a diagram showing the characteristics of the pitch shift of the musical tone according to the performance key.
Figure 12B:
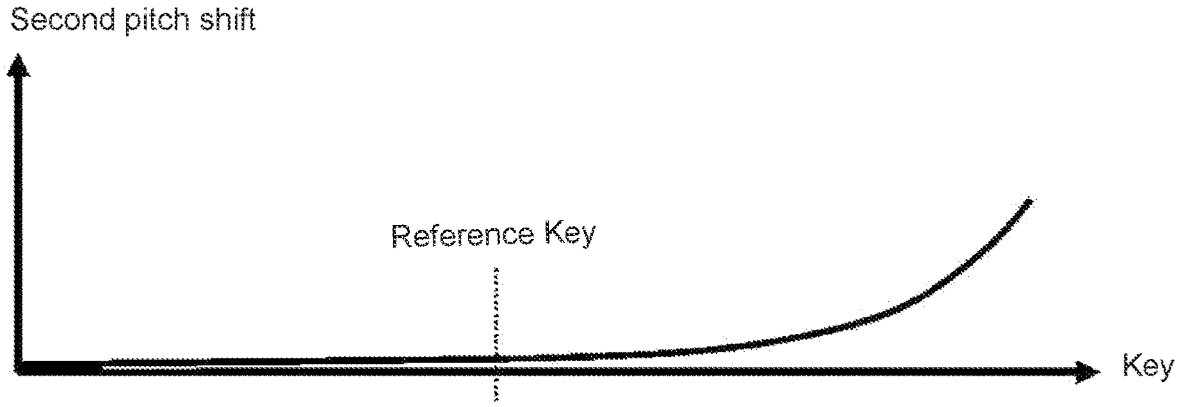
FIG. 12B is a diagram showing the characteristics of the pitch shift of the musical tone according to the performance key.
Figure 12C:
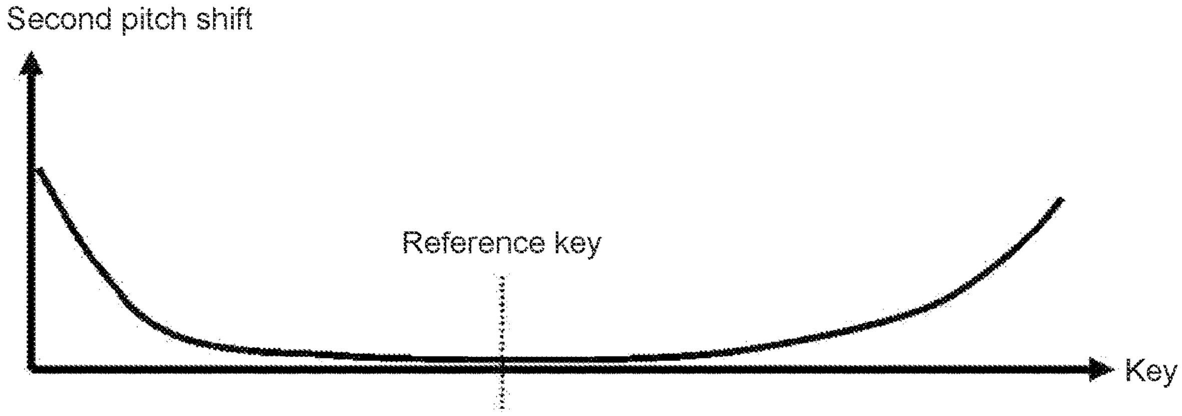
FIG. 12C is a diagram showing the characteristics of the pitch shift of the musical tone according to the performance key.

FIGS. 12A to 12C are diagrams showing the characteristics of the pitch shift of the musical tone according to the performance key (hereinafter referred to as "pitch shift curve characteristic"). It can be said that the pitch shift curve characteristic indicates the pitch shift of the musical tone according to the pitch.

FIG. 12A shows the pitch shift curve characteristic in which the parameter value of the "key link curve (KEY_LINK_CURVE)" corresponds to A. FIG. 12B shows the pitch shift curve characteristic in which the parameter value of the "key link curve (KEY_LINK_CURVE)" corresponds to B. FIG. 12C shows the pitch shift curve characteristic in which the parameter value of the "key link curve (KEY_LINK_CURVE)" corresponds to C. In each of the figures of FIGS. 12A to 12C, the vertical axis represents a value indicating the degree of pitch deviation (a second value indicating the pitch shift of the musical tone, hereinafter referred to as "second pitch shift value"). The horizontal axis shows the played key (in another viewpoint, the difference between the reference key and the played key). The pitch shift curve characteristic data (second characteristic data) is stored in, for example, the ROM 12.

The pitch shift curve characteristic in which the parameter value of the "KEY_LINK_CURVE" corresponds to A indicates the characteristics of an instrument with frets such as an acoustic guitar. Since there are frets, it is unlikely that the pitch of the musical tone will shift in either the high range or the low range.

The pitch shift curve characteristic in which the parameter value of the "KEY_LINK_CURVE" corresponds to B indicates the characteristics of fretless musical instruments such as acoustic bass and violin. Fretless instruments do not have frets, so the pitch of musical tones is more likely to shift than instruments with frets. Further, the higher the key (in the case of a stringed instrument, the higher the position), the shorter the length of the vibrating string, so that the change in the vibration frequency of the string due to the misalignment of the finger holding the string becomes large. Therefore, the pitch shift curve characteristic in which the parameter value corresponds to B is a characteristic in which the pitch shift increases exponentially as the range is higher.

The pitch shift curve characteristic in which the parameter value of the "KEY_LINK_CURVE" corresponds to C indicates the characteristics of a wind instrument or a real human voice that produces a musical sound by breathing. In this case as well, the higher the key, the greater the change in the frequency of the musical tone that accompanies the change in breath. In addition, wind instruments and real voices have a narrower range than stringed instruments. Therefore, the lower the tone, the less accurate it is to generate a musical tone at the correct pitch. In consideration of these, in the pitch shift curve characteristic whose parameter value corresponds to C, the pitch shift increases exponentially as the played key becomes lower than the reference key, and the pitch shift also increases exponentially as the played key becomes higher than the reference key.

The reference key of the pitch shift/deviation curve characteristic of FIGS. 12A to 12C is set based on the parameter value of the "key link curve center key (KEY_LINK_CUR- VE_CENTER_KEY)". The range of the parameter value of the "key link curve center key (KEY_LINK_CURVE_CENTER_KEY)" is, for example, a minimum value of 0 to a maximum value of 127.

For example, when the parameter value of the "key link curve center key (KEY_LINK_CURVE_CENTER_KEY)" is 60, the reference key for the pitch shift curve characteristic is set to C4. When the parameter value of the "key link curve center key (KEY_LINK_CURVE_CENTER_KEY)" is C, the pitch shift increases exponentially as the played key is lower than C4, and the pitch increases exponentially as the played key is higher than C4.

The processor 10 acquires the second pitch shift value according to the selected tone (step S402).

Specifically, the processor 10 refers to the parameter value of the "key link curve (KEY_LINK_CURVE)" and acquires the pitch shift curve characteristic according to the selected tone. The processor 10 acquires the parameter value of the "key link curve center key (KEY_LINK_CURVE_CENTER_KEY)" set for the selected tone, and sets the reference key based on the acquired parameter value. The processor 10 then calculates the difference between the set reference key and the played key. This determines the position of the horizontal axis on the pitch shift curve characteristics. The processor 10 acquires the value of the vertical axis corresponding to the position of the determined horizontal axis, that is, the second pitch deviation value.

The processor 10 acquires a value for changing the pitch of the musical tone based on the second value (second pitch shift value) and the parameter values (key link curve depth (KEY_LINK_CURVE_DEPTH) and key link (KEY_LINK)) (step S403). That is, in step S403, the processor 10 acquires the element value V2 for realizing the pitch shift according to the played key.

Specifically, the processor 10 acquires the parameter value of the "key link curve depth (KEY_LINK_CURVE_DEPTH)" set for the selected tone, and multiplies the second pitch shift value obtained in step S402 by the acquired parameter value. The "key link curve depth (KEY_LINK_CURVE_DEPTH)" is a parameter for adjusting the depth (degree) of the pitch shift curve characteristic, and takes, for example, a minimum value of 0 to a maximum value of 100. Next, the processor 10 acquires the parameter value of the "key link (KEY_LINK)" set for the selected tone, multiplies the second pitch deviation value that has gone through the above multiplication process by the acquired parameter value, and divides it by 100. As a result, the element value V2 is acquired.

The "key link (KEY_LINK)" takes, for example, a minimum value of 0 to a maximum value of 100. For example, a higher value is set as the parameter value of "key link (KEY_LINK)" for an instrument (timbre) in which the pitch is likely to shift depending on the range of the played key.

Thus, the processing content of step S403 is expressed by the following equation.

Element value $V2$=Second pitch shift value×"key link curve depth (KEY_LINK_CURVE_DEPTH)"×"key link (KEY_LINK)"/100

The processor 10 then acquires the element value V3 for producing the pitch shift according to the played speed and the played key (step S404).

Specifically, the processor 10 multiplies the value obtained by dividing the element value V1 acquired in step S401 by 100 and the value obtained by dividing the element value V2 acquired in step S403 by 100. The processor 10 multiplies this multiplication value by the random number R generated in step S304 in order to reflect the tendency of variation in the pitch of the musical tone according to the selected tone. Next, the processor 10 acquires the parameter value of "depth (DEPTH)" set for the selected tone, multiplies the value that has been multiplied by the random number R by the acquired parameter value of "depth (DEPTH)", and divides it by 100. As a result, the element value V3 is acquired. The "depth (DEPTH)" is a parameter for adjusting the depth (degree) of the pitch shift according to the played speed and the played key, and takes, for example, a minimum value of 0 to a maximum value of 100.

Thus, the processing content of step S404 is expressed by the following equation.

Element value $V3$=(element value $V1$/100)×(element value $V2$/100)×random number $R$×"depth (DEPTH)"/100

Consider the case where the musical tone of the same key is produced twice. In the second operation of the same key, the performer sensuously remembers the position of the finger at the time of the first operation more when a shorter time has elapsed since the first operation of the same key (i.e., when the elapsed time T3 is shorter). Therefore, the shorter the elapsed time T3, the closer the position at which the performer plays the same note for the second time relative to the position at which the performer played the note for the first time. Therefore, the shorter the elapsed time T3, the closer the pitch shift of the second time relative to the first time.

Figure 13:
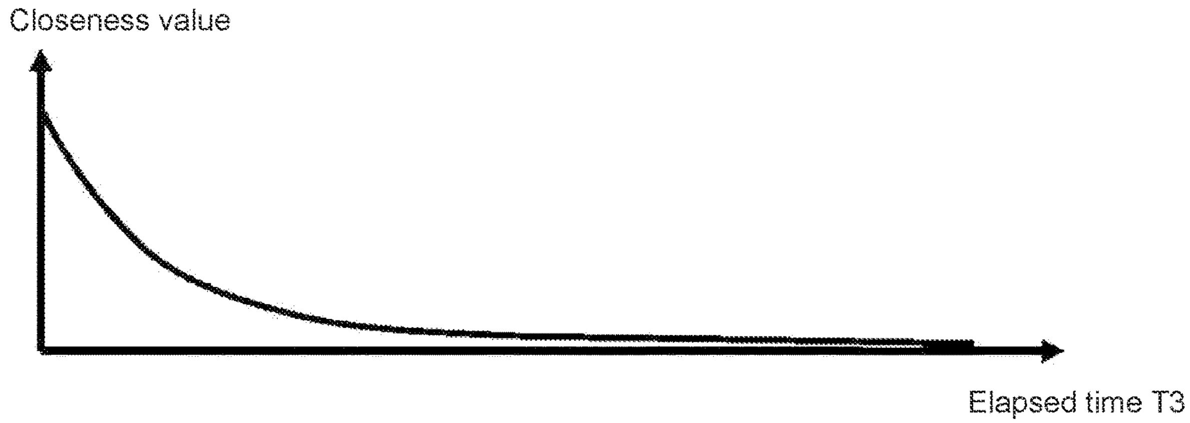
FIG. 13 is a diagram showing the characteristics of the pitch shift of the musical tone according to the interval at which the same key is twice played.

FIG. 13 is a diagram showing the above tendency; it is a diagram showing a closeness characteristic of the pitch with respect to the elapsed time T3. The pitch closeness characteristic is a characteristic indicating how close the pitch of the musical tone of the same key produced for the second time is to the pitch of the musical tone of the same key produced for the first time. In FIG. 13, the vertical axis indicates a value indicating the closeness characteristic (hereinafter referred to as the "closeness value"), and the horizontal axis indicates the elapsed time T3. The higher the closeness value, the smaller the difference in pitch between the first-time musical tone and the second-time musical tone. The lower the closeness value, the larger the difference in pitch between the first-time musical tone and the second-time musical tone. This data indicating the closeness characteristic of the pitch (third characteristic data) is stored in, for example, the ROM 12.

The elapsed time T3 indicates the difference between the time when the current key pressing operation was performed and the time when the previous key pressing operation was performed for the same key. Therefore, the data showing the closeness characteristics of the pitch (third characteristic data) can be said to be characteristic data showing the difference between the pitch of the first musical tone by the first operation and the pitch of the second musical tone by the second operation according to the elapsed time T3 (second elapsed time) that has elapsed since when the first operation is performed on an operation element (key) until when the second operation is performed on the same operation element (key). The closeness value shown in FIG. 13 can be said to be a value (third value) indicating the above difference.

The processor 10 acquires a value for changing the pitch of the musical tone based on the third value (closeness value) and the parameter value of "Repeat link (REPEAT_LINK)" (step S405). That is, in step S405, the processor 10 acquires the element value V4 for producing the pitch deviation in consideration of this closeness characteristic (step S405).

Specifically, the processor 10 acquires the element value V3 associated with the key number acquired in step S202 of FIG. 4 from the keyboard sound production map 111 (that is, value for producing a pitch shift when the key pressed this time was previously pressed). The processor 10 then refers to the data showing the closeness characteristic of the pitch, and acquires the closeness value according to the elapsed time T3 that has been acquired in step S205 or step S206 of FIG. 4. Next, the processor 10 acquires the parameter value of the "repeat link (REPEAT_LINK)" set for the selected tone, multiplies the acquired parameter value of the "repeat link", the element value V3, and the acquired closeness value together and divides it by 100. As a result, the element value V4 is acquired. The parameter value of "repeat link (REPEAT_LINK)" takes, for example, a minimum value of 0 to a maximum value of 100.

Thus, the processing content of step S405 is expressed by the following equation.

Element value $V4$=Element value $V3$×Closeness value×"Repeat link (REPEAT_LINK)"/100

The processor 10 updates the element value V3 registered in the keyboard sound production map 111 (step S406). Specifically, the processor 10 updates the element value V3 associated with the key number acquired in step S202 of FIG. 4 with the element value V3 acquired in step S404.

The processor 10 then acquires the pitch deviation value V5 indicating an initial pitch shift when the sound starts to emit in order to produce the pitch shift of the musical tone in accordance with various elements (the played speed, the played key, and the interval at which the same key is operated twice) (step S407).

Specifically, the processor 10 multiplies the added value of the element value V3 acquired in step S404 and the element value V4 acquired in step S405 by a predetermined adjustment value and divides it by 400. As a result, the pitch shift value V5 is acquired.

Figure 14:
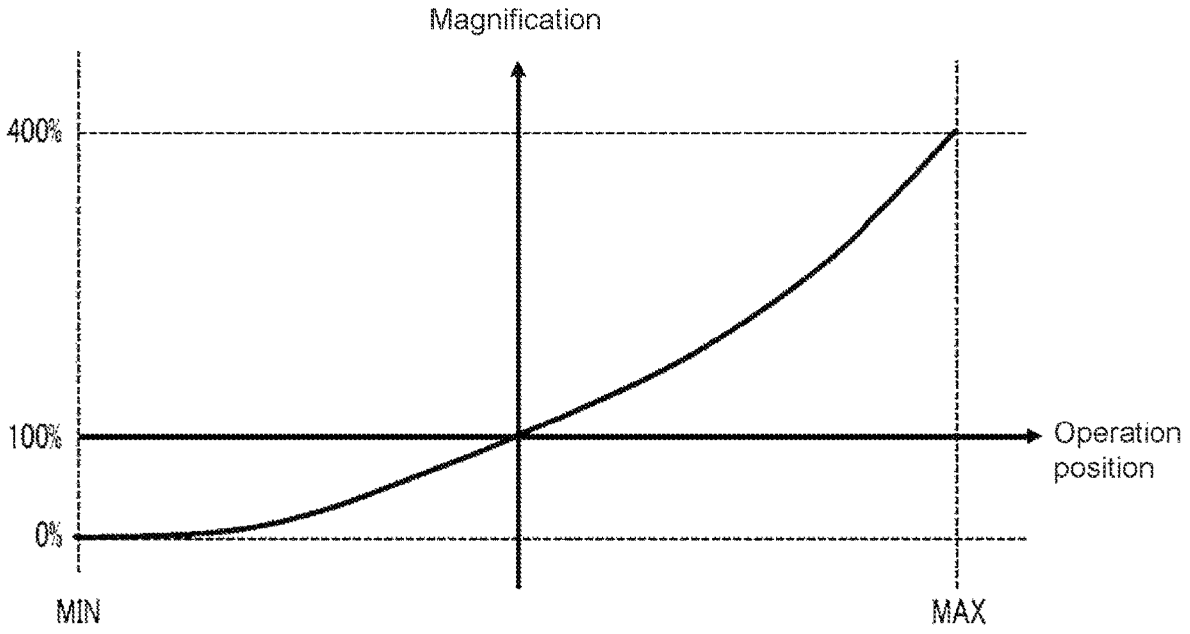
FIG. 14 is a diagram showing the characteristics of a pitch adjusting knob provided in the electronic musical instrument according to an embodiment of the present invention.

The performer can adjust the value of the adjustment value (magnification) by operating the pitch adjustment knob 23. FIG. 14 is a diagram showing the relationship between the magnification and the operation position of the pitch adjustment knob 23. In FIG. 14, the vertical axis indicates the magnification (unit: %), and the horizontal axis indicates the operation position of the pitch adjustment knob 23. When the operation position is MIN, the predetermined magnification becomes 0%. Therefore, the pitch shift value V5 becomes zero, which is the minimum value. As the operating position is closer to MAX (magnification: 400%) from MIN (magnification: 0%), the magnification increases, so the pitch shift value V5 also increases. Therefore, the performer can adjust the magnitude of pitch shift of the musical tone of the selected tone produced by the electronic musical instrument 1 by operating the pitch adjustment knob 23.

The pitch deviation value V5 indicates the amount of initial pitch shift at the beginning of sound, taking into consideration the played speed, the played key, and the closeness characteristics. In step S106 of FIG. 3, the processor 10 changes the pitch of the musical tone to be sound-produced based on the waveform data 121 (musical tone data) based on the pitch deviation value V5. Specifically, the processor 10 instructs the sound source LSI 19 to add the deviation amount indicated by the pitch deviation value V5 to the correct pitch in producing a musical tone. As a result, a natural musical tone is produced at a pitch having an appropriate deviation according to the selected tone color and the playing style of the performer.

Thus, the processing content of step S407 is expressed by the following equation.

Pitch deviation value $V5$=(element value $V3$+element value $V4$)×magnification/400

When the performer recognizes that the pitch has shifted at the beginning of the sound, the performer performs a performance operation to correct this shift. The correction here means that the shifted pitch is brought closer to the reference pitch. In order to produce the effect of such a performance that corrects the pitch shift, the processor 10 acquires the element value V6 (step S408) and acquires the element value V7 (step S409). The processor 10 then acquires (derives) a correction speed at which the pitch shift is being corrected, based on the acquired element values V6 and V7 (step S410).

Specifically, in step S408, the processor 10 acquires the parameter value of the "EG rate time link (EG_RATE_TIME_LINK)" set for the selected tone, and multiplies the first pitch shift value that has been acquired in step S401 by the acquired parameter value of the "EG rate time link". As a result, the element value V6 is acquired. The element value V6 indicates the correction speed of the pitch shift according to the played speed.

The faster the tempo of the music, the higher the correction speed at which the performer corrects the pitch shift. This is because if the correction speed is not increased, the timing of the next musical tone will arrive before the pitch shift is completely corrected. Therefore, for example, a higher value is set as a parameter value of "EG rate time link (EG_RATE_TIME_LINK)" for an instrument (tone) in which the tempo of the music to be played tends to be faster. The parameter value of "EG rate time link (EG_RATE_TIME_LINK)" takes, for example, a minimum value of 0 to a maximum value of 100.

Thus, the processing content of step S408 is expressed by the following equation.

Element value $V6$=First pitch shift value×"EG rate time link (EG_RATE_TIME_LINK)"

In step S409, the processor 10 acquires the parameter value of the "EG rate key link (EG_RATE_KEY_LINK)" set for the selected tone, and multiplies the second pitch shift value acquired in step S402 by the acquired parameter value of the "EG rate key link". As a result, the element value V7 is acquired. The element value V7 indicates the correction speed of the pitch shift according to the played key.

The higher the key (more accurately, the higher the position in the case of a stringed instrument), the larger the pitch shift with respect to the amount of finger movement when the finger is moved to change the position (that is, when the position of the finger holding the string is changed). Therefore, the higher the key, the higher the correction speed for correcting the pitch shift/deviation. Therefore, for example, for instruments/tone having higher such a tendency, a higher parameter value is set for the "EG rate key link (EG_RATE_KEY_LINK)". The parameter value of the "EG rate key link (EG_RATE_KEY_LINK)" takes, for example, a minimum value of 0 to a maximum value of 100.

Thus, the processing content of step S409 is expressed by the following equation.

Element value $V7$=Second pitch shift value×"EG rate key link (EG_RATE_KEY_LINK)"

In step S410, the processor 10 acquires the parameter value of the "EG rate (EG_RATE)" set for the selected tone. The processor 10 multiplies the value obtained by dividing the element value V6 acquired in step S408 by 100 and the value obtained by dividing the element value V7 acquired in step S409 by 100. This multiplication value indicates the correction speed of the pitch shift according to the played key and the played speed. The processor 10 then multiplies this multiplication value by the acquired "EG rate (EG_RATE)" parameter value. As a result, the correction speed is acquired.

Figure 15:
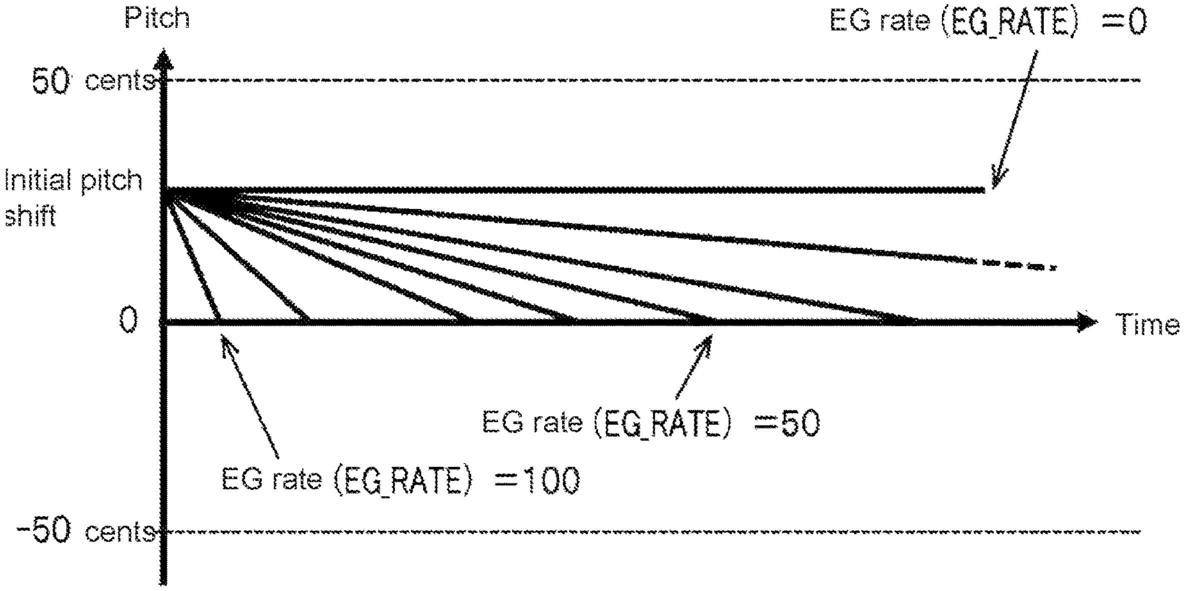
FIG. 15 is a diagram relating to a correction speed for correcting an initial pitch shift/deviation of a musical tone.

"EG rate (EG_RATE)" is a parameter for adjusting the correction speed of pitch shift/deviation. The parameter value of "EG rate (EG_RATE)" takes, for example, a minimum value of 0 to a maximum value of 100. FIG. 15 is a schematic diagram showing the relationship between the "EG rate (EG_RATE)" and the correction speed. In FIG. 15, the vertical axis indicates pitch (unit: cents), and the horizontal axis indicates time.

As shown in FIG. 15, when the parameter value of "EG rate (EG_RATE)" is 0, the correction speed is also 0. In this case, the initial pitch shift of the musical tone is not corrected. The higher the parameter value of "EG rate (EG_RATE)", the higher the correction speed, and the pitch shift of the musical tone is corrected quickly.

Thus, the processing content of step S410 is expressed by the following equation.

$$\text{Correction speed}=(\text{element value } V6/100)\times(\text{element value } V7/100)\times\text{"EG rate (EG\_RATE)"}$$

In step S106 of FIG. 3, with respect to the musical tone that is being generated based on the waveform data 121 (musical tone data), the processor 10 changes the initial pitch thereof and corrects the initial pitch based on the pitch shift value V5 and the correction speed. Specifically, the processor 10 instructs the sound source LSI 19 to add the pitch shift amount indicated by the pitch shift value V5 to the correct pitch and to correct the musical tone that has been added with the pitch shift amount at the correction speed acquired in step S410. As a result, a natural musical tone is produced at a pitch having an appropriate shift/deviation according to the selected tone color and the playing style of the performer, and the pitch deviation is corrected at a natural correction speed.

For example, stringed instruments without frets such as acoustic bass and violin do not have a mechanism equivalent to a keyboard that specifies a pitch in semitone units. Further, even though a wind instrument such as a trumpet or a saxophone has keys for specifying a pitch in semitone units, the produced pitch may not be in tune due to various factors. Therefore, in this kind of acoustic instrument, it is difficult to produce the musical tone at accurate pitch, and the musical tone is usually produced at a slightly deviated pitch. Therefore, the produced musical tones sounds more natural to humans if the pitch of the musical tone is slightly offset. When a musical tone is produced at an accurate pitch as in the electronic musical instrument exemplified in Japanese Patent Application Laid-Open No. 2008-89975, a so-called mechanical sound is produced and the produced musical tone sounds unnatural. However, as described above, the present embodiment provides the electronic musical instrument 1, the method executed by the electronic musical instrument 1, which may be a computer, and the pitch change program 120 in which improvements are made for bringing the musical tone to be produced closer to that of the natural musical instrument.

In addition, the present invention is not limited to the above-described embodiment, and can be variously modified at the implementation stage without departing from the gist thereof. In addition, the functions executed in the above-described embodiment may be combined as appropriate. The embodiments described above include various stages, and various inventions can be extracted by an appropriate combination according to a plurality of disclosed constituent elements. For example, even if some constituent elements are deleted from all the constituent elements shown in the embodiment, if the substantially same effect is obtained, the configuration in which the constituent elements are deleted can be extracted as an invention.

In the above embodiment, the initial pitch shift in the produced musical sound to is provided based on the pitch shift value V5 (based on the played speed, the played key, and the above-described closeness characteristics), but the configuration of the present invention is not limited to this. For example, the present invention also may have a configuration in which the initial pitch shift is based on only one or two of the played speed (in such a case the element value V1), the played key (in such a case, the element value V2), and the closeness characteristic (in such a case, the element value V4).

In the above embodiment, the pitch of the musical tone is changed based on the played speed and the played key. More specifically, the initial pitch of the musical tone is corrected at a correction speed according to the played speed and the played key, but the configuration of the present invention is not limited to this. For example, the present invention may have a configuration in which the initial pitch of a musical tone is corrected at a correction speed derived based on one of the played speed (that is, the element value V6) and the played key (that is, the element value V7). In addition, the present invention may have a configuration in which the initial pitch of a musical tone is corrected based on at least one of the played speed and the played pitch.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An information processing device, comprising:

an input interface; and at least one processor, configured to perform the following:

selecting an instrument, a musical tone of which is to be digitally synthesized based on corresponding musical tone data, via the input interface;

acquiring a parameter value that has been set for the selected instrument;

generating a random number based on a random function; and changing a pitch of the musical tone of the selected instrument based on the generated random number and the acquired parameter value, wherein the information processing device further comprises a memory storing characteristic data indicating characteristics of pitch shifts of musical tones of the selected instrument relative to a reference pitch, wherein the at least one processor is configured to acquire a value indicating a pitch shift of the musical tone of the selected instrument from the characteristic data, and changes the pitch of the musical tone of the selected instrument based on the acquired parameter value and the acquired value indicating the pitch shift, wherein the information processing device further comprises at least one performance element, wherein the characteristic data include third characteristic data indicating a pitch difference of a first musical tone produced by a first operation of one of the at least one performance element and a second musical tone produced by a second operation of the same one of the at least one performance element that occurs successively from the first operation, the pitch difference being dependent upon a second elapsed time that has elapsed since the first operation until the second operation, and wherein the at least one processor is configured to acquire a third value indicating said pitch difference from the third characteristic data, and changes the pitch of the musical tone of the selected instrument based on the acquired parameter value and the acquired third value.

2. The information processing device according to claim 1, wherein the characteristic data include first characteristic data indicating a pitch shift of the musical tone in accordance with a first elapsed time that has elapsed until an operation of the at least one performance element since an immediately prior operation of the at least one performance element, and wherein the at least one processor is configured to acquire a first value indicating a pitch shift of the musical tone of the selected instrument from the first characteristic data, and changes the pitch of the musical tone of the selected instrument based on the acquired parameter value and the acquired first value indicating the pitch shift.

3. The information processing device according to claim 1, wherein the characteristic data include second characteristic data indicating a pitch shift of the musical tone in accordance with a pitch, and wherein the at least one processor is configured to acquire a second value indicating a pitch shift of the musical tone of the selected instrument from the second characteristic data, and changes the pitch of the musical tone of the selected instrument based on the acquired parameter value and the acquired second value indicating the pitch shift.

4. The information processing device according to claim 1, wherein the at least one processor is configured to change the pitch of the musical tone of the selected instrument based on at least one of played speed and played pitch.

5. The information processing device according to claim 1, wherein the at least one processor is configured to multiply the generated random number and the acquired parameter value together and change the pitch of the musical tone of the selected instrument based on a value obtained by the multiplication.

6. The information processing device according to claim 5, wherein the at least one processor determines a range in which the random number is generated in accordance with a type of the instrument selected, and generates the random number within said range.

7. The information processing device according to claim 1, further comprising a speaker that emits sound of the musical tone.

8. A method performed by at least one processor included in an information processing device that includes, in addition to the at least one processor, an input interface, the method comprising, via the at least one processor:

selecting an instrument, a musical tone of which is to be digitally synthesized based on corresponding musical tone data, via the input interface;

acquiring a parameter value that has been set for the selected instrument;

generating a random number based on a random function; and changing a pitch of the musical tone of the selected instrument based on the generated random number and the acquired parameter value, wherein the information processing device further includes a memory storing characteristic data indicating characteristics of pitch shifts of musical tones of the selected instrument relative to a reference pitch, wherein the method includes, via the at least one processor, acquiring a value indicating a pitch shift of the musical tone of the selected instrument from the characteristic data, and changing the pitch of the musical tone of the selected instrument based on the acquired parameter value and the acquired value indicating the pitch shift, wherein the information processing device further includes at least one performance element, wherein the characteristic data include third characteristic data indicating a pitch difference of a first musical tone produced by a first operation of one of the at least one performance element and a second musical tone produced by a second operation of the same one of the at least one performance element that occurs successively from the first operation, the pitch difference being dependent upon a second elapsed time that has elapsed since the first operation until the second operation, and wherein the method includes, via the at least one processor, acquiring a third value indicating said pitch difference from the third characteristic data, and changing the pitch of the musical tone of the selected instrument based on the acquired parameter value and the acquired third value.

9. The method according to claim 8, wherein the characteristic data include first characteristic data indicating a pitch shift of the musical tone in accordance with a first elapsed time that has elapsed until an operation of the at least one performance element since an immediately prior operation of the at least one performance element, and wherein the method includes, via the at least one processor, acquiring a first value indicating a pitch shift of the musical tone of the selected instrument from the first characteristic data, and changing the pitch of the musical tone of the selected instrument based on the acquired parameter value and the acquired first value indicating the pitch shift.

10. The method according to claim 8, wherein the characteristic data include second characteristic data indicating a pitch shift of the musical tone in accordance with a pitch, and wherein the method includes, via the at least one processor, acquiring a second value indicating a pitch shift of the musical tone of the selected instrument from the second characteristic data, and changing the pitch of the musical tone of the selected instrument based on the acquired parameter value and the acquired second value indicating the pitch shift.

11. The method according to claim 8, wherein the pitch of the musical tone of the selected instrument is changed based on at least one of played speed and played pitch.

12. The method according to claim 8, wherein the generated random number and the acquired parameter value are multiplied together and the pitch of the musical tone of the selected instrument is changed based on a value obtained by the multiplication.

13. The method according to claim 12, wherein a range in which the random number is generated is determined in accordance with a type of the instrument selected, and the random number is generated within said range.

14. A non-transitory computer-readable storage medium storing a program readable and executable by at least one processor included in an information processing device that includes, in addition to the at least one processor, an input interface, the program causing the at least one processor to perform the following:

selecting an instrument, a musical tone of which is to be digitally synthesized based on corresponding musical tone data, via the input interface;

acquiring a parameter value that has been set for the selected instrument;

generating a random number based on a random function; and changing a pitch of the musical tone of the selected instrument based on the generated random number and the acquired parameter value, wherein the information processing device further includes a memory storing characteristic data indicating characteristics of pitch shifts of musical tones of the selected instrument relative to a reference pitch, wherein the program causes the at least one processor to perform the following: acquiring a value indicating a pitch shift of the musical tone of the selected instrument from the characteristic data, and changing the pitch of the musical tone of the selected instrument based on the acquired parameter value and the acquired value indicating the pitch shift, wherein the information processing device further includes at least one performance element, wherein the characteristic data include third characteristic data indicating a pitch difference of a first musical tone produced by a first operation of one of the at least one performance element and a second musical tone produced by a second operation of the same one of the at least one performance element that occurs successively from the first operation, the pitch difference being dependent upon a second elapsed time that has elapsed since the first operation until the second operation, and wherein the program causes the at least one processor to perform the following: acquiring a third value indicating said pitch difference from the third characteristic data, and changing the pitch of the musical tone of the selected instrument based on the acquired parameter value and the acquired third value.

* * * * *